A. BRASEN.
MILLING CUTTER.
APPLICATION FILED APR. 5, 1920.

1,381,059.

Patented June 7, 1921.

Axel Brasen
INVENTOR

BY Victor J. Evans
ATTORNEY

WITNESS:

UNITED STATES PATENT OFFICE.

AXEL BRASEN, OF ASTORIA, NEW YORK.

MILLING-CUTTER.

1,381,059.  Specification of Letters Patent. Patented June 7, 1921.

Application filed April 5, 1920. Serial No. 371,359.

*To all whom it may concern:*

Be it known that I, AXEL BRASEN, a subject of the King of Denmark, residing at Astoria, in the county of Queens and State of New York, have invented new and useful Improvements in Milling-Cutters, of which the following is a specification.

This invention relates to milling cutters and the primary object is to provide an article of this kind in which the teeth may be formed on two members which are capable of being separated by washers for making different width cuts.

Another object is to so form each of the sections of the cutter that toothed portions of one of the sections may be snugly fitted or rabbeted between similar toothed portions of the other section.

Other objects will appear from the following description and claim.

All of these objects are attained by mechanism shown in the accompanying drawing consisting of one sheet in which:—

Like characters of reference refer to like parts throughout the several views.

Figure 1:
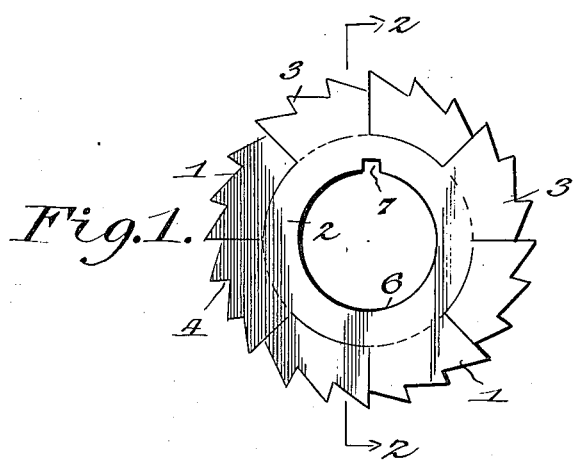
Figure 1 is a side elevation of my improved milling cutter, assembled.
Figure 2:
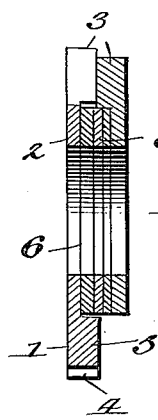
Fig. 2 is a vertical sectional view taken substantially in line 2—2, Fig. 1, and showing the cutter extended.
Figure 3:
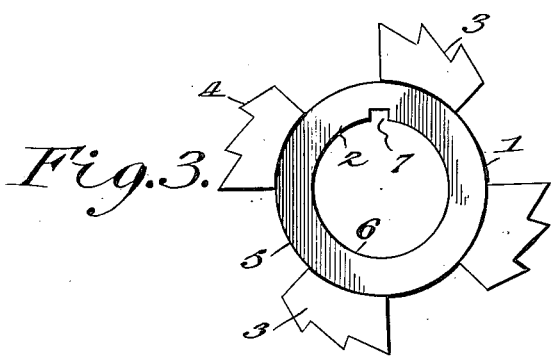
Fig. 3 is a side elevation of one of the sections of my improved cutter.
Figure 5:
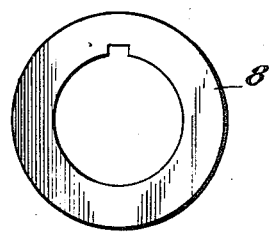
Fig. 5 is a detail view of one of the washers.

Referring particularly to Fig. 3, 1 represents one of the sections of my milling cutter, the same being provided with a central body portion 2 and tooth carrying sections 3. Each of the sections 3 is provided with a plurality of teeth 4, and each section 3 not only extends radially from the body portion 2 but is also formed with a broader face so as to form a flange 5 as shown in Fig. 2. Each of the members 1 is provided with a central aperture 6 to accommodate the arbor or mandrel to which it may be attached, a keyway 7 being provided for the usual attachment. 8, Figs. 1, 2 and 5 represents washers which may be of varying thickness so as to procure a variety of widths of cuts from the same cutter.

Figure 4:
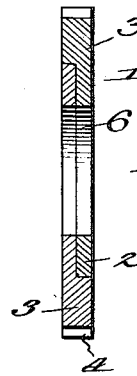
Fig. 4 is a view similar to Fig. 2 but with the filler washers removed and the cutter adjusted for a finer cut.

In operation the cutter is adapted to make cuts of width varying from that of the face of the tooth portion 3 under the arrangement shown in Fig. 4 to that of the width shown under the arrangement shown in Fig. 2. As shown in Figs. 1, 2 and 4, the cutter comprises two of the sections 1, the toothed portions 3 of one of the sections being adapted to fit between the similar portions of the other member 1 with the flange 5 overlying the body portion of the other section 1. When the two sections are snugly fitted together as shown in Fig. 4 it is obvious that a cut of the width of the face of the teeth will be made; and that when a wider width is desired a washer 8 of sufficient thickness is interposed between the two sections, the maximum cut which may thus be attained being that shown in Fig. 2 which is substantially double the minimum cut which is shown in Fig. 4.

While I have described what I consider to be the best embodiment of my invention it is obvious that many of the details may be varied without in any way departing from the spirit of my invention and I therefore do not limit myself to the exact details herein set forth nor to anything less than the whole of my invention limited only by the appended claim.

Now having described my invention what I claim as new and desire to secure by Letters-Patent is:—

A milling cutter comprising a plurality of sections, each provided with cutting teeth and constructed so as to interlock with each other and to be adjustable with relation to each other for taking different width cuts and each provided with an aperture having a keyway and with one substantially flat face, and means adapted to be inserted between the interlocking faces of said sections for maintaining said sections in predetermined spaced relation.

In testimony whereof I have affixed my signature.

AXEL BRASEN.